US012151415B1

(12) United States Patent
Vora

(10) Patent No.: US 12,151,415 B1
(45) Date of Patent: Nov. 26, 2024

(54) HOT TO COLD RUNNER SYSTEM FOR GOLF BALL INJECTION MOLD AND METHODS OF USING SAME

(71) Applicant: Acushnet Company, Fairhaven, MA (US)

(72) Inventor: Ajay Vora, Foxboro, MA (US)

(73) Assignee: Acushnet Company, Fairhaven, MA (US)

( * ) Notice: Subject to any disclaimer, the term of this patent is extended or adjusted under 35 U.S.C. 154(b) by 30 days.

(21) Appl. No.: 17/736,533

(22) Filed: May 4, 2022

Related U.S. Application Data

(60) Provisional application No. 63/185,508, filed on May 7, 2021.

(51) Int. Cl.
 *B29C 45/27* (2006.01)
 *B29C 45/14* (2006.01)
 *B29K 75/00* (2006.01)
 *B29L 31/54* (2006.01)

(52) U.S. Cl.
 CPC .... *B29C 45/2737* (2013.01); *B29C 45/14073* (2013.01); *B29C 45/14819* (2013.01); *B29C 45/2708* (2013.01); *B29C 45/2756* (2013.01); *B29C 45/278* (2013.01); *B29C 2045/2753* (2013.01); *B29K 2075/00* (2013.01); *B29L 2031/546* (2013.01)

(58) Field of Classification Search
 CPC ............... B29C 45/14073; B29L 2031/546
 See application file for complete search history.

(56) References Cited

U.S. PATENT DOCUMENTS

| 5,985,370 A | * | 11/1999 | Ohira | C08J 7/12 |
|---|---|---|---|---|
| | | | | 427/430.1 |
| 6,235,230 B1 | | 5/2001 | Puniello | |
| 2001/0038167 A1 | * | 11/2001 | Brune | B29C 45/561 |
| | | | | 264/294 |
| 2001/0045688 A1 | * | 11/2001 | Royer | B29C 45/14073 |
| | | | | 264/278 |

(Continued)

FOREIGN PATENT DOCUMENTS

GB   1313748 A  *  4/1973  ....... B29C 45/14073

OTHER PUBLICATIONS

Kerkstra, R Hot Runners: A View from the Bottom Up from Plastics Technology, (pub: Feb. 22, 2016) https://www.ptonline.com/articles/tooling-hot-runners-a-view-from-the-bottom-upp. (Year: 2016).*

*Primary Examiner* — Jacob T Minskey
*Assistant Examiner* — Wayne K. Swier
(74) *Attorney, Agent, or Firm* — Bradley Arant Boult Cummings LLP

(57) ABSTRACT

A hot to cold runner system for a golf ball injection mold is disclosed. The hot to cold runner system includes a hot runner for supplying layer-forming material in a molten state, the hot runner including a heated manifold having a hot runner drop connected thereto, and a cold runner operatively connected to the hot runner drop such that the cold runner is in fluid communication with the hot runner. The cold runner injects the material into a mold cavity to form a golf ball layer over a core. Methods of forming a golf ball layer by injection molding using the hot to cold runner system are also disclosed.

17 Claims, 2 Drawing Sheets

(56) References Cited

U.S. PATENT DOCUMENTS

| | | | |
|---|---|---|---|
| 2011/0130216 A1* | 6/2011 | Kim | B29C 45/2708 473/378 |
| 2013/0334737 A1* | 12/2013 | Wiegmans | B29C 45/2708 264/278 |
| 2018/0297258 A1* | 10/2018 | Zhu | B29C 45/78 |
| 2019/0118440 A1* | 4/2019 | Moriya | B29C 45/2806 |

* cited by examiner

HOT TO COLD RUNNER SYSTEM FOR GOLF BALL INJECTION MOLD AND METHODS OF USING SAME

TECHNICAL FIELD

The present disclosure relates generally to a hot to cold runner system for a retractable pin injection mold for forming a cover over a golf ball.

BACKGROUND

Conventionally, golf ball covers are made by either compression molding two preformed half shells about a core or by injection molding of a thermoplastic material about a core. Current retractable pin injection molds ("RPIMs") for forming golf ball cover layers utilize a series of conduits to transport a thermoplastic material to individual mold cavities. These conduits are referred to as runners and are typically uninsulated. The thermoplastic material travels through the cold runners and passes into the mold cavity through gates, which are positioned at the mold parting line.

While RPIMs with cold runner systems are widely used, these multi-cavity cold runner molds have several drawbacks. In particular, the cold runner molds deal with severe shear imbalance and high pressure due to directional changes at each runner junction as well as "freezing" of material due to longer travel of the melt front. This is especially a major challenge when forming thin thermoplastic polyurethane covers with RPIMs. The melt flow material also needs to be injected at a much higher temperature and induce shear at the gates to fill the poles of the mold cavity completely. Moreover, cold runner systems typically generate 60 percent or more regrind with thin covers. The high level of regrind is particularly problematic when forming thin thermoplastic polyurethane covers.

Hot runner systems help eliminate some of the disadvantages of the cold runner systems, but still possess inherent drawbacks which lead to imperfections in the golf ball surface design. Hot runner systems target elimination of the runner system all together, which require hot runner drops to inject the thermoplastic material at the pole of each cavity. Directly injecting the thermoplastic material into the cavity, however, results in stresses and vestige left behind on the dimpled cover. This results in undesirable quality and finishing implications.

Accordingly, there remains a need in the art for an improved retractable pin injection mold design that eliminates or reduces unbalanced, non-uniform flow and produces golf ball layers having reduced stresses and defects and better overall impact durability.

SUMMARY

The problems expounded above, as well as others, are addressed by the following inventions, although it is to be understood that not every embodiment of the inventions described herein will address each of the problems described above.

In some embodiments, an injection mold for forming a golf ball layer is disclosed, the injection mold including a hot runner for supplying layer-forming material in a molten state with a uniform flow front and improved shear balance, the hot runner including a heated manifold having a hot runner drop connected thereto; a cold runner operatively connected to the hot runner drop such that the cold runner is in fluid communication with the hot runner; a substantially spherical shaped mold cavity having an opening in which the cold runner extends thereto; and a gate, for example, a ring gate or an edge gate, positioned at the opening of the mold cavity and configured to allow the layer-forming material to flow into the mold cavity.

In one embodiment, the hot runner drop includes a heated nozzle tip for transporting the molten layer-forming material to the cold runner. In another embodiment, the hot runner maintains the layer-forming material at a temperature of about 430° F. to about 450° F. In still another embodiment, the layer-forming material is a thermoplastic polyurethane. In yet another embodiment, the hot runner drop is configured to reduce the distance the layer-forming material travels to the cold runner by at least about ten inches when compared to a conventional cold runner system.

In other embodiments, a method of forming a golf ball layer by injection molding is disclosed, the method including securely positioning a golf ball core into an injection mold having a substantially spherically shaped mold cavity; supplying a layer-forming material through a hot runner to a cold runner disposed substantially around the mold cavity, wherein the hot runner includes a heated manifold having a hot runner drop connected thereto and the cold runner is operatively connected to the hot runner drop such that the cold runner is in fluid communication with the hot runner; filling the mold cavity with the layer-forming material through one or more gates that extend around a circumference of the mold cavity until the mold cavity is completely filled; allowing the layer-forming material to harden; and removing the ball from the mold.

In one embodiment, the golf ball core is securely positioned by retractable pins. The retractable pins may be hydraulically, pneumatically, or electrically actuated. In another embodiment, the hot runner supplies the layer-forming material at a temperature of about 430° F. to about 450° F. In still another embodiment, the hot runner prevents a loss in temperature of the layer-forming material of three degrees or less. In yet another embodiment, the hot runner drop includes a heated nozzle tip for supplying the molten layer-forming material to the cold runner.

In further embodiments, a method of forming a golf ball layer by injection molding is provided, the method including positioning a golf ball core in an injection mold having a substantially spherically shaped mold cavity; supplying a layer-forming material through a hot runner, wherein the hot runner includes a heated manifold configured to maintain the layer-forming material at a first temperature, for example, a temperature of about 430° F. to about 450° F.; supplying the layer-forming material from the hot runner to a cold runner disposed substantially around the mold cavity; filling the cold runner with the layer-forming material, wherein the cold runner maintains the layer-forming material at a second temperature and the second temperature is no more than three degrees lower than the first temperature; injecting the layer-forming material into the mold cavity through a gate extending around a circumference of the mold cavity until the mold cavity is completely filled; and allowing the layer-forming material to harden to form the golf ball layer. In some embodiments, the method may further include extending a plurality of retractable pins into the mold cavity to securely position the golf ball core prior to the step of injecting the layer-forming material into the mold cavity. In other embodiments, the method may further include withdrawing the plurality of retractable pins from the mold cavity before the injected layer-forming material contacts the retractable pins. In yet other embodiments, the gate may be a ring gate or an edge gate. In still further embodiments, the layer-forming material may be a thermoplastic polyurethane. In yet further embodiments, the second temperature is no more than two degrees lower than the first temperature. In further embodiments, the layer-forming material is supplied from the hot runner to a cold runner through a hot runner drop having a heated nozzle tip.

In still other embodiments, a method of forming a golf ball by injection molding is provided, the method including positioning a golf ball core in an injection mold having a substantially spherically shaped mold cavity; extending a plurality of retractable pins into the mold cavity to securely position the golf ball core; supplying a layer-forming material through a hot runner, wherein the hot runner includes a heated manifold and a hot runner drop connected thereto, wherein the heated manifold is configured to maintain the layer-forming material at a first temperature of at least about 430° F.; supplying the layer-forming material from the hot runner drop to a cold runner disposed substantially around the mold cavity; filling the cold runner with the layer-forming material, wherein the cold runner maintains the layer-forming material at a second temperature and the second temperature is no more than one degree lower than the first temperature; injecting the layer-forming material into the mold cavity through a gate extending around a circumference of the mold cavity until the mold cavity is completely filled; and allowing the layer-forming material to harden to form a golf ball. In some embodiments, the hot runner drop is configured to reduce the distance the layer-forming material travels to the cold runner by at least about ten inches when compared to a conventional cold runner system. In other embodiments, the hot runner drop includes a heated nozzle tip for transporting the layer-forming material to the cold runner. In further embodiments, the method may further include surface treating the golf ball. In still further embodiments, the layer-forming material is a thermoplastic polyurethane. In yet further embodiments, the retractable pins are hydraulically, pneumatically, or electrically actuated.

BRIEF DESCRIPTION OF THE DRAWINGS

Further features and advantages can be ascertained from the following detailed description that is provided in connection with the drawings described below.

DETAILED DESCRIPTION

Figure 1:
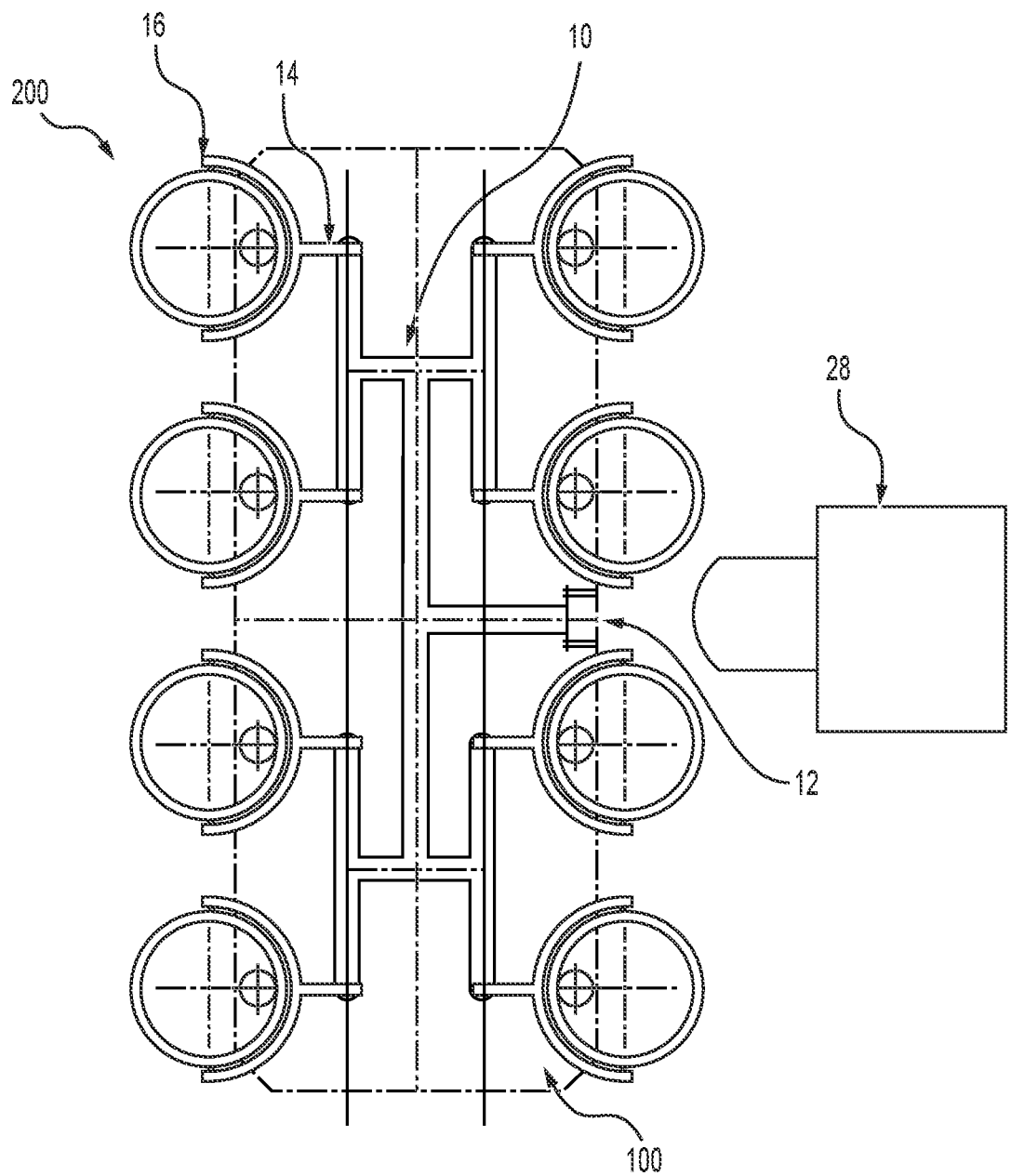
FIG. 1 is a top plan view of a golf ball mold assembly and a runner system according to an exemplary embodiment of the present disclosure.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural (i.e., "at least one") forms as well, unless the context clearly indicates otherwise.

Spatially relative terms, such as "above," "under," "below," "lower," "over," "upper," and the like, may be used herein for ease of description to describe one element or feature's relationship to another when the apparatus is right side up as shown in the accompanying drawings.

Terms such as "at least one of A and B" should be understood to mean "only A, only B, or both A and B." The same construction should be applied to longer lists (e.g., "at least one of A, B, and C").

The term "may" as used herein refers to features that are optional (i.e., "may or may not,"), and should not be construed to limit what is described.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The present disclosure provides an improved hot to cold runner system for a retractable pin injection mold ("RPIM"). The hot to cold runner system described herein combines the use of a hot runner system with a cold tertiary runner. The hot runner system feeds molten injection material to cold tertiary runners that inject the material into a mold cavity to form a golf ball layer over a core. The golf balls formed using the system of the present disclosure have improved physical, aerodynamic, and cosmetic properties. For example, the hot to cold runner system reduces the melt front travel distance of the injection material to the tertiary runner, which, in turn, reduces cooling of the injection material as it travels from the reservoir to the tertiary runner. In addition, since the system of the present disclosure incorporates a hot runner, lower injection pressures can generally be used. This means that the pressure rise in the tertiary runner is much less than in conventional cold runner systems and any suitable gates can be deployed to induce the required shear while avoiding interference to the dimples. Moreover, the hot to cold runner system of the present disclosure provides for a balanced, uniform flow into each mold cavity with similar shear.

Referring to FIG. 1, a golf ball mold assembly 200, such as a RPIM system, incorporating a hot to cold runner system 100 according to an exemplary embodiment of the present disclosure is shown. As illustrated in FIG. 1, the runner system 100 according to the present disclosure includes a hot runner system 10 located within a horizontal plane. The hot runner system 10 includes a heated manifold 12 having a plurality of hot runner drops 14 that retain heated nozzle tips (not shown) for transporting a molten injection material from the heated manifold 12 to a plurality of mold cavities. The heated manifold 12 is operatively connected to an injection molding machine nozzle 28. The injection molding machine nozzle 28 is connected to a reservoir (not shown) that houses the injection material. During the injection molding process, the injection material enters the mold assembly 200 from the injection molding machine nozzle 28 and the heated manifold 12 distributes the molten injection material to the hot runner drops 14.

The hot runner drops 14 supply continuously heated injection material from the heated manifold 12 to each of the mold cavities. In the illustrated embodiment, there are eight hot runner drops 14 corresponding to eight mold cavities. However, the number of hot runner drops may vary depending on the number of mold cavities utilized in the golf ball mold assembly 200. Generally, each mold cavity utilizes at least one hot runner drop. For example, the hot to cold runner system 100 of the present disclosure may include twelve hot runner drops that may be utilized with a golf ball mold assembly having twelve mold cavities. In another embodiment, the hot to cold runner system 100 of the present disclosure may include sixteen hot runner drops that may be utilized with a golf ball mold assembly having sixteen mold cavities. In further embodiments, each mold cavity may utilize more than one hot runner drop. For instance, each mold cavity may utilize two or more hot runner drops. In this embodiment, a golf ball mold assembly having eight mold cavities may utilize sixteen hot runner drops (two hot runner drops per mold).

The heated manifold 12 and the hot runner drops 14 maintain the injection material in a molten state, which advantageously reduces cooling of the injection material as it travels from the reservoir to the mold cavities. For example, the injection material in the hot runner system 10 of the present disclosure loses less than three degrees in temperature as it travels from the reservoir to the mold cavities. In other embodiments, the injection material in the hot runner system 10 loses less than two degrees in temperature as it travels from the reservoir to the mold cavities. In still other embodiments, the hot runner system 10 prevents a loss in temperature of the injection material of no more than one degree. For instance, the hot runner system 10 prevents a loss in temperature of the injection material as it travels from the reservoir to the mold cavities of no more than a half of a degree. In one embodiment, the hot runner system 10 maintains the injection material at a temperature of at least about 430° F. In another embodiment, the hot runner system 10 maintains the injection material at a temperature of at least about 440° F. In still another embodiment, the hot runner system 10 maintains the injection material at a temperature of at least about 450° F. In still other embodiments, the hot runner system 10 maintains the injection material at a temperature of at least about 460° F.

Suitable layer-forming injection materials that may be used with the hot runner system 10 include, but are not limited to, partially neutralized ionomers; bimodal ionomers, such as Surlyn® AD 1043, 1092, and 1022 ionomer resins, commercially available from E. I. du Pont de Nemours and Company; ionomers modified with rosins; polyolefins; polyamides; polyesters; polyethers; polycarbonates; polysulfones; polyacetals; polylactones; acrylonitrile-butadiene-styrene resins; polyphenylene oxide; polyphenylene sulfide; styrene-acrylonitrile resins; styrene maleic anhydride; polyimides; aromatic polyketones; ionomers and ionomeric precursors, acid copolymers, and conventional HNPs; polyurethanes, such as thermoplastic polyurethanes; grafted and non-grafted metallocene-catalyzed polymers, such as single-site catalyst polymerized polymers, high crystalline acid polymers, cationic ionomers, and combinations thereof.

In one embodiment, the layer-forming injection material used with the hot runner system 10 includes a thermoplastic polyurethane. For example, the hot runner system 10 of the present disclosure may be used to form an outer cover layer including thermoplastic polyurethane (TPU). Commercially-available examples of suitable thermoplastic polyurethanes that can be used in accordance with this invention include TPUs sold under the trade names of Texin® 250, Texin® 255, Texin® 260, Texin® 270, Texin® 950U, Texin® 970U, Texin® 1049, Texin® 990DP7-1191, Texin® DP7-1202, Texin® 990R, Texin® 993, Texin® DP7-1049, Texin® 3203, Texin® 4203, Texin® 4206, Texin® 4210, Texin® 4215, and Texin® 3215, each commercially available from Covestro LLC, Pittsburgh Pa.; Estane® 50 DT3, Estane® 58212, Estane® 55DT3, Estane® 58887, Estane® EZ14-23A, Estane® ETE 50DT3, each commercially available from Lubrizol Company of Cleveland, Ohio; and Elastollan® WY1149, Elastollan® 1154D53, Elastollan® 1180A, Elastollan® 1190A, Elastollan® 1195A, Elastollan® 1185AW, Elastollan® 1175AW, each commercially available from BASF; Desmopan® 453, commercially available from Bayer of Pittsburgh, Pa., and the E-Series TPUs, such as D 60 E 4024 commercially available from Huntsman Polyurethanes of Germany.

As shown in FIG. 1, each of the hot runner drops 14 feed into a cold tertiary runner 16 that leads directly to the mold cavity. The cold tertiary runner 16 is unheated and acts as a delivery system that distributes the molten injection material to the mold cavities. More particularly, the hot runner drop 14 feeds the molten injection material into the cold tertiary runner 16, which then feeds the injection material to an opening of the mold cavity. In some embodiments, the hot to cold runner system 100 may incorporate the use of a secondary runner (not shown). For example, the hot runner drop 14 may feed the molten injection material into a secondary runner, which may then feed the injection material into the cold tertiary runner 16. The use of a secondary runner in addition to the tertiary runner can improve the balance of the thermal, flow, and material properties of the injection material.

The injection material may enter the mold cavity through any suitable type of gate. Different injection-molding gates can be used in accordance with the present disclosure and the number of gates can also vary. In one embodiment, the runner system 100 may utilize ring injection-molding gates, such as those described in U.S. Pat. No. 6,235,230 to Puniello, the disclosure of which is hereby incorporated by reference. Such a design may improve the concentricity of the formed golf ball. In another embodiment, the runner system 100 may utilize edge gates. As described above, hot runner drops that directly inject material into the mold cavity create stresses and vestige on the injection molded layer, which lead to undesirable quality and finishing implications. By utilizing hot runner drops 14 that feed into cold tertiary runners 16 (rather than directly into the mold cavities), the hot to cold runner system 100 of the present disclosure provides for injection molded layers having improved quality.

In some embodiments, the hot runner system 10, including the heated manifold 12 and the hot runner drops 14, reduces the distance the injection material travels from the injection molding machine nozzle 28 to each of the cold tertiary runners 16 when compared to conventional cold runner systems. For instance, the hot runner system 10 of the present disclosure reduces the distance between the injection molding machine nozzle 28 and each of the cold tertiary runners 16 by at least about ten inches when compared to a conventional cold runner system. In another embodiment, the hot runner system 10 of the present disclosure reduces the distance between the injection molding machine nozzle 28 and each of the cold tertiary runners 16 by at least about twelve inches when compared to a conventional cold runner system. In still another embodiment, the hot runner system 10 of the present disclosure reduces the distance between the injection molding machine nozzle 28 and each of the cold tertiary runners 16 by at least about fourteen inches when compared to a conventional cold runner system. In still further embodiments, the hot runner system 10 reduces the distance between the injection molding machine nozzle 28 and each of the cold tertiary runners 16 by at least about eighteen inches when compared to a conventional cold runner system.

In other embodiments, the hot runner system 10, including the heated manifold 12 and the hot runner drops 14, reduces the number of turns the injection material travels therethrough from the injection molding machine nozzle 28 to the cold tertiary runners 16. In conventional cold runner systems, an injection material typically travels through three or more turns before reaching the tertiary runner. The hot runner system 10 of the present disclosure reduces the number of turns the injection material travels therethrough by at least one turn when compared to conventional cold runner systems. In another embodiment, the hot runner system 10 reduces the number of turns the injection material travels therethrough by at least two turns when compared to conventional cold runner systems. In still another embodiment, the hot runner system 10 reduces the number of turns the injection material travels therethrough by at least three turns when compared to conventional cold runner systems. With a reduction of the number of turns the injection material must travel therethrough, the hot to cold runner system 100 provides for a symmetrical shear distribution of the injection material as it travels through the runner system. Without being bound by any particular theory, the multiple turns employed in conventional cold runner systems cause an imbalance in the shear of the material, e.g., the material closer to the outside wall has a different shear than the inside material. In an effort to reduce this shear imbalance, melt flippers are employed. Due to the improved shear distribution provided by the hot to cold runner system 100 of the present invention, the runner system dispenses of the need for melt flippers.

Figure 2:
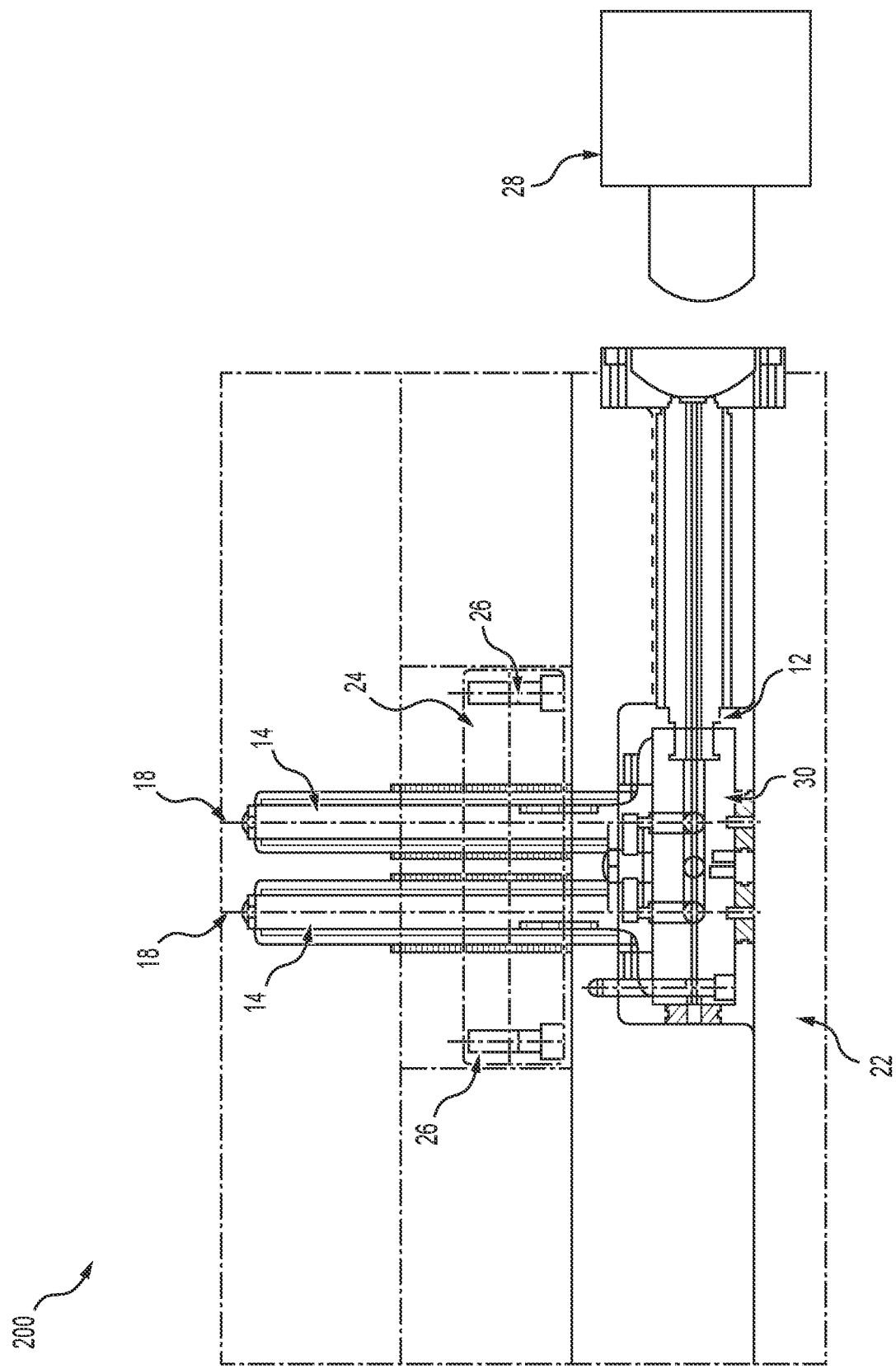
FIG. 2 is a cross sectional view of the golf ball mold assembly showing the hot runner system according to an embodiment of the present disclosure.

FIG. 2 shows a cross-sectional view of the golf ball mold assembly 200 and the hot runner system 10 of the present disclosure. The hot runner system 10 is heated by the heated manifold 12. As illustrated in FIG. 2, the heated manifold 12 is positioned in a bottom half of the mold assembly 200 and disposed above a fixed mold plate 22. The heated manifold 12 is in fluid communication with the injection molding machine nozzle 28 to allow for the injection molding machine nozzle 28 to feed injection material to the heated manifold 12. The heated manifold 12 may include one or more gates 30, such as thermal gates or valve gates, for feeding the injection material to the hot runner drops 14. The heated manifold 12 distributes the injection material to each of the hot runner drops 14. In the illustrated embodiment, the hot runner drops 14 are positioned perpendicular to and in fluid communication with the heated manifold 12. Each of the hot runner drops 14 includes a heated nozzle tip 18 that feeds the injection material to the cold tertiary runner 16.

The runner system 100 of the present disclosure may be used with any type of retractable pin injection mold ("RPIM") system. In such systems, at the initial stage of the injection molding process, a golf ball core placed inside the mold is supported centrally within the mold by a plurality of retractable pins so as to leave a space for forming an intermediate or cover layer about the core. The retractable pins engage with the core to hold it securely in place. The layer-forming injection material is then forced through the gates extending around the circumference of the mold cavity simultaneously filling the space between the golf ball core and inner surface of the mold cavity. Once the golf ball core is securely held in position by the injection material (and before the injected layer-forming material contacts the retractable pins), the retractable pins may be disengaged from the core. Injection of the layer-forming material continues until the mold cavity is completely filled. The injection material is then allowed to cool and harden. Once the injection material has sufficiently cooled, the mold cavity is opened, and the golf ball is removed for further processing (for example, for forming additional layers and/or surface treatments). The golf ball mold assembly 200 may also include an eject plate 24 for removing the finished golf ball from the mold assembly 200.

In some embodiments, the golf ball mold assembly 200 shown in FIG. 2 may include retractable pins 26. The retractable pins 26 may be driven by hydraulic, pneumatic, or electric actuators. The use of hydraulically, pneumatically, or electrically actuated retractable pins 26 allows for precise control over the movement of the pins 26, which, in turn, allows for the formation of golf balls having optimal concentricity. As will be appreciated by one of ordinary skill in the art of golf ball manufacture (as well as the typical player), the more accurate centering of the ball results in more consistent results and an improved game. For example, in one embodiment, a golf ball formed using the runner system 100 of the present disclosure has a cover thickness that is substantially equal at each of the various points measured. In this aspect, the thickness variation may be equal to or less than 0.003 inches. More specifically, the thickness of the cover of the golf ball does not vary more than 0.003 inches at any measured point.

In a preferred embodiment, the runner system 100 disclosed herein is utilized in a RPIM for forming a thin outer cover or inner cover layer of a golf ball. In this embodiment, the runner system 100 of the present disclosure can produce golf balls having thinner walls (for example, thinner cover layers) than golf balls produced from conventional cold runner systems. For example, the runner system 100 of the present disclosure can produce cover layers having a thickness that is about 0.030 inches or less than cover layers produced from conventional cold runner systems. In another embodiment, the runner system 100 of the present disclosure can produce cover layers having a thickness that is about 0.025 inches or less than cover layers produced from conventional cold runner systems. While the runner system 100 is advantageous in producing thin cover layers, as will be apparent to one of ordinary skill in the art, the runner system 100 may also be utilized in a RPIM for forming an intermediate layer, such as an inner mantle layer or an outer mantle layer, or outer core layer of a golf ball.

The use of the hot runner system 10, including the heated manifold 12 and the hot runner drops 14, also advantageously provides for faster cycle times and the generation of less regrind when compared to conventional cold runner systems. For example, the runner system 100 of the present disclosure results in a regrind level of about 20 percent or less. In another embodiment, the runner system 100 of the present disclosure results in a regrind level of about 15 percent or less. In still another embodiment, the runner system 100 of the present disclosure results in a regrind level about 10 percent or less. In some embodiments, the runner system 100 of the present disclosure provides for cycle times that are at least about 10 percent faster than cycle times of conventional cold runner systems. In another embodiment, the runner system 100 of the present disclosure provides for cycle times that are at least about 15 percent faster than cycle times of conventional cold runner systems. In still another embodiment, the runner system 100 of the present disclosure provides for cycle times that are up to 25 percent faster than cycle times of conventional cold runner systems.

Moreover, the runner system 100 of the present disclosure provides for a balanced, uniform flow into each mold cavity with similar shear. The balanced flow results in consistent and uniform physical and cosmetic properties among each of the golf balls formed in the respective mold cavities. The balanced, uniform flow also prevents unfills in the "last to fill" mold cavity and trapped air in the "first to fill" mold cavity, which are typical issues encountered with conventional cold runner systems. Furthermore, golf ball covers formed using the runner system 100 described herein have high mechanical strength and improved wedge cover shear durability (for example, resistance to scuffing, cutting, and tearing).

The foregoing description illustrates and describes the processes, manufactures, and other teachings of the present disclosure. Additionally, the disclosure shows and describes only certain embodiments of the processes, manufactures, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described hereinabove are further intended to explain certain best modes known of practicing the processes, manufactures, and other teachings of the present disclosure and to enable others skilled in the art to utilize the teachings of the present disclosure in such, or other, embodiments and with the various modifications required by the particular applications or uses. Accordingly, the processes, manufactures, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

What is claimed is:

1. A method of forming a golf ball component by injection molding, comprising:
    positioning a golf ball core into an injection mold having a substantially spherically shaped mold cavity;
    feeding a layer-forming material through a hot runner disposed substantially around the mold cavity, wherein the hot runner comprises a heated manifold having a hot runner drop connected thereto;
    feeding the layer-forming material into a cold runner fixedly secured to the hot runner;
    filling the mold cavity with the layer-forming material through a gate in the cold runner that extends around a circumference of the mold cavity until the mold cavity is completely filled;
    allowing the layer-forming material to cool and harden around the core while in the mold cavity to form a golf ball component; and
    removing the golf ball component from the injection mold.

2. The method of claim 1, further comprising extending a plurality of retractable pins into the mold cavity to securely position the golf ball core.

3. The method of claim 2, wherein the retractable pins are hydraulically, pneumatically, or electrically actuated.

4. The method of claim 1, wherein the layer-forming material is fed through the hot runner at a first temperature of about 430° F. to about 450° F.

5. The method of claim 4, wherein the layer-forming material is fed to the mold cavity from the cold runner at a second temperature and the second temperature is no more than three degrees lower than the first temperature.

6. The method of claim 1, wherein the hot runner drop comprises a heated nozzle tip for feeding the layer-forming material into the cold runner.

7. A method of forming a golf ball by injection molding, comprising:
    positioning a golf ball core in an injection mold having a substantially spherically shaped mold cavity;
    feeding a layer-forming material through a hot runner, wherein the hot runner comprises a heated manifold configured to maintain the layer-forming material at a first temperature and a hot runner drop comprising a heated nozzle tip attached thereto;
    feeding the layer-forming material into a cold runner fixedly secured to the heated nozzle tip;
    filling the cold runner with the layer-forming material, wherein the cold runner maintains the layer-forming material at a second temperature and the second temperature is no more than three degrees lower than the first temperature;
    injecting the layer-forming material into the mold cavity through a gate in the cold runner that extends around a circumference of the mold cavity until the mold cavity is completely filled;
    allowing the layer-forming material to cool and harden around the core while in the mold cavity to form the golf ball; and
    removing the golf ball from the injection mold.

8. The method of claim 7, further comprising extending a plurality of retractable pins into the mold cavity to securely position the golf ball core prior to the step of injecting the layer-forming material into the mold cavity.

9. The method of claim 8, further comprising withdrawing the plurality of retractable pins from the mold cavity before the injected layer-forming material contacts the retractable pins.

10. The method of claim 7, wherein the gate is a ring gate or an edge gate.

11. The method of claim 7, wherein the first temperature is about 430° F. to about 450° F.

12. The method of claim 7, wherein the layer-forming material is a thermoplastic polyurethane.

13. The method of claim 7, wherein the second temperature is no more than two degrees lower than the first temperature.

14. A method of forming a golf ball by injection molding, comprising:
    positioning a golf ball core in an injection mold having a substantially spherically shaped mold cavity;
    extending a plurality of retractable pins into the mold cavity to securely position the golf ball core;
    feeding a layer-forming material through a hot runner, wherein the hot runner comprises a heated manifold and a hot runner drop connected thereto, wherein the hot runner drop comprises a heated nozzle tip attached thereto and the heated manifold is configured to maintain the layer-forming material at a first temperature of about 430° F. to about 450° F.;
    feeding the layer-forming material into a cold runner fixedly secured to the heated nozzle tip;

filling the cold runner with the layer-forming material, wherein the cold runner maintains the layer-forming material at a second temperature and the second temperature is no more than one degree lower than the first temperature;

injecting the layer-forming material into the mold cavity through a gate in the cold runner that extends around a circumference of the mold cavity until the mold cavity is completely filled; and allowing the layer-forming material to harden around the core to form the golf ball.

15. The method of claim 14, further comprising surface treating the golf ball.

16. The method of claim 14, wherein the layer-forming material is a thermoplastic polyurethane.

17. The method of claim 14, wherein the retractable pins are hydraulically, pneumatically, or electrically actuated.

* * * * *